July 16, 1929.  R. O. STEPHENSON  1,720,769
ROTARY CUTTER
Filed Dec. 15, 1927  2 Sheets-Sheet 1

INVENTOR
Richard O. Stephenson
By his Attorney,
Nelson Howard

July 16, 1929.                R. O. STEPHENSON                1,720,769
                                ROTARY CUTTER
                            Filed Dec. 15, 1927           2 Sheets-Sheet 2

INVENTOR
Richard O. Stephenson
By his Attorney,
Nelson M. Howard

Patented July 16, 1929.

1,720,769

UNITED STATES PATENT OFFICE.

RICHARD O. STEPHENSON, OF BEVERLY, MASSACHUSETTS, ASSIGNOR TO UNITED SHOE MACHINERY CORPORATION, OF PATERSON, NEW JERSEY, A CORPORATION OF NEW JERSEY.

ROTARY CUTTER.

Application filed December 15, 1927. Serial No. 240,306.

This invention relates to annular cutters and is herein illustrated as embodied in a cutter having an endless cutting edge formed with a series of scallops or undulations and designed for trimming surplus material from the inseam of a shoe in process of manufacture. It is to be understood, however, that the invention is not limited to cutters of the exact shape illustrated nor to cutters for performing the particular operation mentioned.

Various cutting and trimming machines, of which inseam-trimming machines are typical examples, utilize rotary annular cutters, those commonly used in machines of the type named having endless scalloped cutting edges which afford a relatively vigorous attack upon the stock to be cut and thereby insure rapid cutting and prolong the periods of effectiveness between successive sharpenings of the cutting edge.

To provide in such a cutter a scalloped cutting edge, all portions of which are equally distant from the axis of rotation, it has been the practice to give the cutter a frusto-conical form, to provide it with flutes in one face, and to sharpen the cutting edge by grinding the opposite face to circular form. By so forming and grinding the cutter the cutting edge derives a scalloped formation from the flutes which extend back from said edge far enough to outlast the useful life of the cutter.

In the manufacture of fluted cutters of the type above referred to, it has been the practice to arrange the flutes in the same relation as that of the teeth of an ordinary bevel gear so that they radiate or diverge from a common center coincidental with the axis of the cutter, as shown, for example, in United States Letters Patent No. 1,226,872, granted May 22, 1917, on application of Andrew Eppler. The scallops or undulations formed in the cutting edge by grinding the cutter to intersect such flutes afford a very rapid and satisfactory cutting action but it sometimes happens that the cutting points or "teeth" do not all protrude to the same extent and that the periods of effectiveness between sharpenings of the cutter are shortened, since the entire cutting burden then falls on the relatively few teeth which project farther than the others. Such non-uniformity in the extent of protrusion of the cutting teeth is due to non-circularity of the cutter, and such non-circularity is due to warping or distortion of the cutter and is caused by hardening and tempering the latter.

To preface a more complete explanation of the causes of non-circularity of the former type of cutter, let it be assumed that a cutter-blank has been formed with flutes that radiate or diverge from the axis of the blank, and that the blank has been heated and cooled first to harden it and again to temper it. Incidentally to heating and cooling the cutter some portions of the latter undergo changes of temperature earlier than other portions, and the unequal expansion and contraction due to the differential in time alters the circumferential shape of the blank so that even if it were truly circular before being heated it would, and frequently does, assume a slightly elliptical or other non-circular cross-section. Consequently, when, after being distorted either by hardening or by tempering or by both, the blank is ground to a truly circular shape at one end to form the cutting edge, the "high spots", considering radial dimensions, are ground away more than the "low spots", and the cutter is therefore shortened more at the high spots. This causes the cutting teeth at the low spots to protrude axially beyond all the others, and places the major portion of the cutting burden, if not the entire cutting burden, on the few relatively prominent teeth, while the less prominent teeth fall short of reaching the stock to be cut. Consequently, the more prominent teeth are rapidly dulled and the cutter requires sharpening at more frequent intervals than it otherwise would, and does not last as long as it would, if all the teeth shared equally in doing the work.

To overcome the condition above mentioned, an object of the present invention is to provide a fluted, annular cutter that will not be warped or distorted by hardening or tempering it, to the end that a circular cross-section once embodied in a cutter blank prior to hardening and tempering will be preserved.

I have found that if the flutes of a fluted annular cutter are skewed to lie in oblique relation to the circumference of the cutter, they maintain the initial cross-sectional shape of the cutter against any distortional tendency occasioned by hardening or tempering the cutter thereafter. Accordingly, a feature of the invention consists in an annular, fluted cutter the flutes of which are skewed to lie in the oblique relation above described.

Referring to the accompanying drawings, which illustrate a preferred embodiment of the invention:

Figure 1:
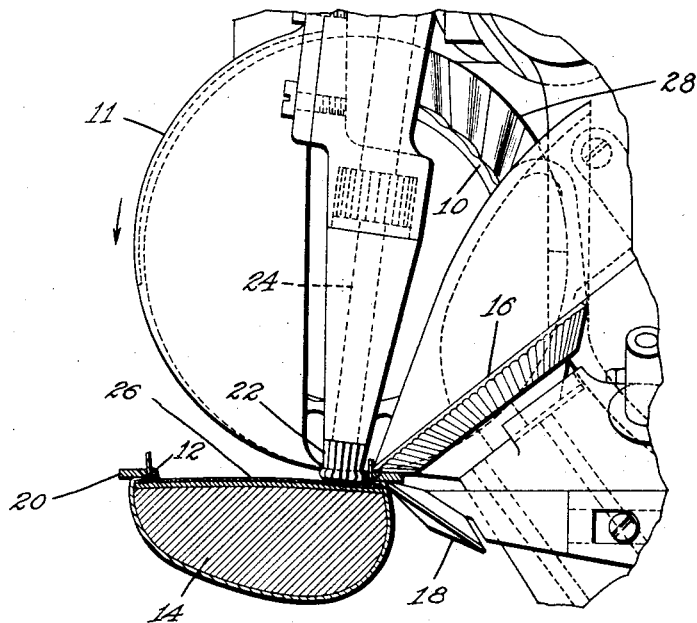
Fig. 1 is a side elevation of a portion of an inseam trimming machine equipped with a cutter of the type hereinafter described.
Figure 2:
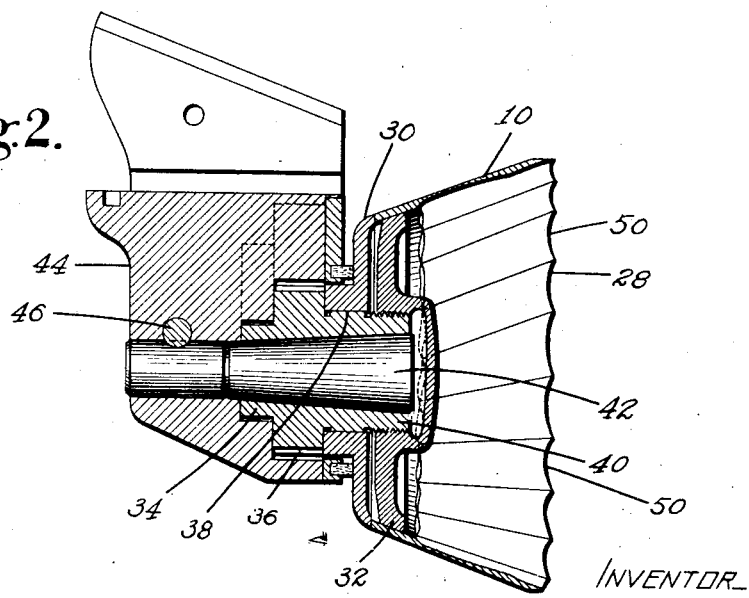
Fig. 2 is a sectional view of such cutter and the structure by which it is supported.

In so far as Figs. 1 and 2 illustrate the construction of an inseam trimming machine, such construction is similar to that more fully shown and described in said Letters Patent No. 1,226,872, excepting the construction of the trimming cutter.

The trimming cutter 10, which is hereinafter described in detail is driven rotatively in the direction indicated by an arrow in Fig. 1 to trim the inseam 12 of a shoe 14 in process of manufacture. A segmental guard 11 covers a portion of the cutter. A driven feed roll 16 and an idle presser roll 18 are arranged to clamp the projecting margin of the welt 20 between them, the feed roll being driven in a direction that causes the inseam portion of the shoe to advance lengthwise of the axis of the trimming cutter. A knurled roll 22 carried by a driven shaft 24 engages the inner side of the inseam materials to maintain the latter in an upright position against the rim of the feed roll 16 and to assist the latter in feeding the work. The lower end of the roll 22 also engages the face of the insole 26 to control the closeness of trimming.

As shown in Fig. 2, the trimming cutter 10 is frusto-conical and provided with an endless circumferential cutting edge 28 at its larger end. The smaller end of the cutter engages a rotary holder or carrier comprising cooperative clamping members 30, 32, the member 30 being arranged to abut the rear end of the cutter while the member 32 engages the internal surface of the cutter and conforms to the conicity thereof. Both the clamping members 30 and 32 are carried by a sleeve 34 having a spur gear portion 36, a cylindric portion 38 and a screw-threaded portion 40. The clamping member 30 bears upon and is centered by the portion 38 and abuts the gear portion 36, while the clamping member 32, which is formed with an internal screw-thread, is screwed upon the portion 40 to force the cutter against the member 30 with sufficient pressure to make the assemblage tight. A notch 37 is formed in the rear edge of the cutter to receive a lug (not shown) with which the member 30 may be provided to hold the cutter against slipping. The sleeve 34 is formed with a tapered bore to receive a correspondingly tapered bearing stud 42. This stud is secured in a portion 44 of the machine frame by a cotter pin 46 which is notched and intersected by a portion of the stud 42. The pin 46 provides for adjusting the stud 42 lengthwise to take up looseness of the sleeve 34, suitable means (not shown) being provided to make the pin 46 and the stud 42 tight by movement of the pin lengthwise of its axis. The gear portion 36 of the sleeve is engaged by a gear of a suitable driving train (not shown) to drive the cutter 10 as hereinbefore stated.

The cutter shown in the drawings is an annular steel shell of circular cross-section and frusto-conical profile. As illustrated, the internal surface of the cutter is provided with arcuate flutes 48 which extend from its larger end toward, but not quite to, its smaller end, a portion of the smaller end being without flutes to provide a frusto-conical bearing surface for the clamping member 32. The purpose of the flutes 48 is to produce scallops 50 in the cutting edge 28 in consequence of grinding a circular external surface 51 to intersect the internal flutes 48. The result of such flutes and such grinding is the formation of a continuous circular cutting edge having pointed cutting teeth projecting axially. In cutters heretofore provided with internal flutes for this purpose the flutes have been arranged to diverge or radiate from a common center coincidental with the axis of the cutter, but cutters so made are readily susceptible to circumferential distortion, and become distorted more or less by unequal contraction of the metal due to differentials in the cooling transition after they have been heated for hardening and tempering.

Figure 3:
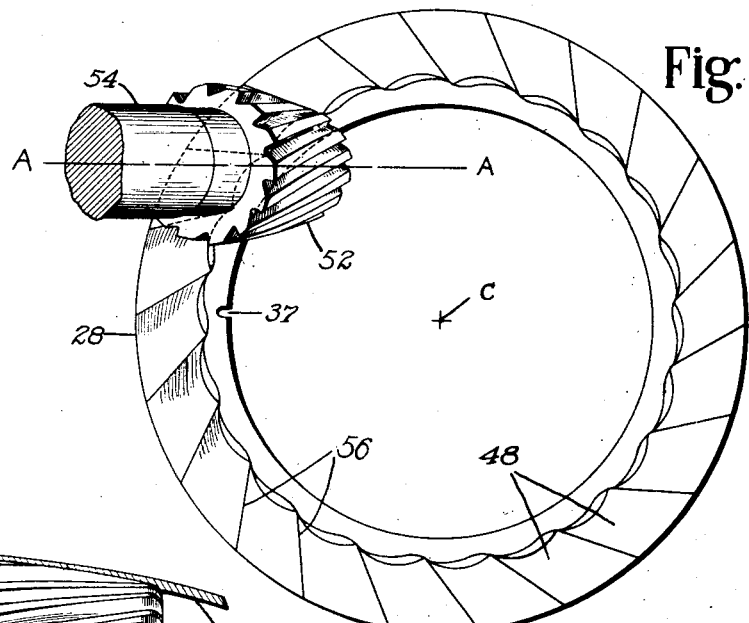
Fig. 3 is an end elevation of the trimming cutter shown in Figs. 1 and 2 and includes a milling cutter to illustrate the relation in which the trimming cutter and the milling cutter are maintained while the latter is cutting the flutes in the trimming cutter.
Figures 5, 6:
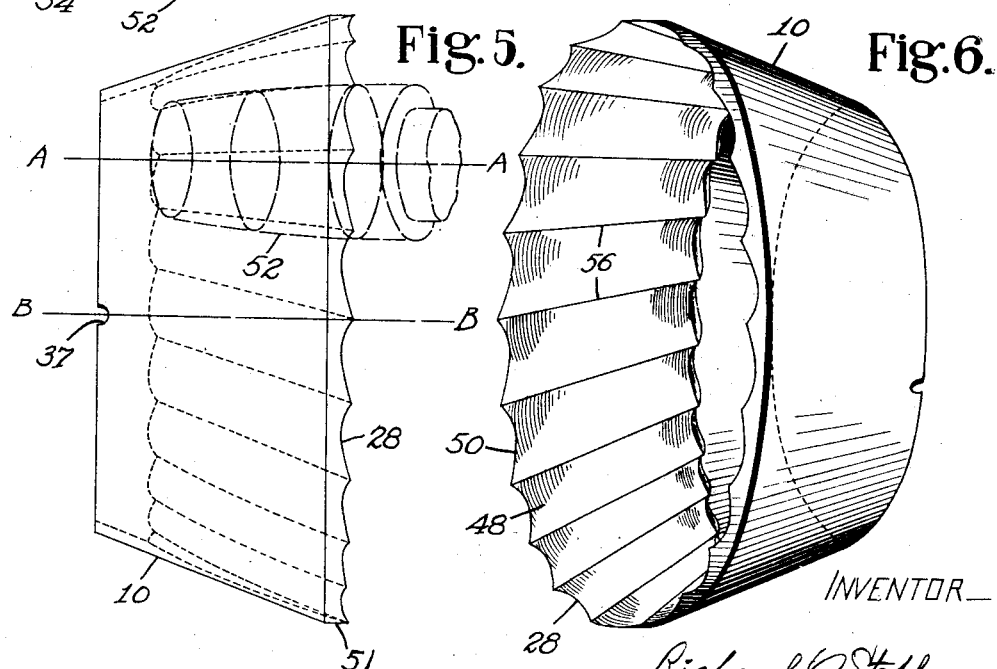
Fig. 5 is a side elevation of a completed trimming cutter and includes broken lines representing the milling cutter to show the relation of the two cutters from still another point of view.
Fig. 6 is a perspective view of a completed trimming cutter.

To guard against such distortion the present invention provides a remedy which consists in forming the flutes in oblique or skewed relation to the circumference of the cutter. Figs. 3 and 5 illustrate how a milling cutter 52 may be used to produce the desired arrangement of flutes in a trimming cutter of the type shown. In each of these figures the axis of the milling cutter and its driving arbor 54 are indicated by a broken line A—A, while in Fig. 5 the axis of the cutter 10 is indicated by a broken line B—B. Although in Fig. 5 the two said axes appear to be parallel, they are not parallel, although the planes in which they lie are parallel, the axis A—A being oblique relatively to the axis B—B to an extent consistent with the conicity of the cutter 10. As shown in Fig. 3, the axis A—A is offset a considerable distance from the center C of the cutter 10, and while the two cutters are in this relation the cutter 52 may be rotated to cut first one and then another of the flues 48. In consequence of generating the flutes in the skewed relation shown, the ribs or ridges 56 that separate them also receive a circumferential component in addition to their divergent component. Thus, any distortional tendency of the cutter away from a truly circular cross-section while the metal is cooling is prevented by the circumferential component of the ribs.

Figure 4:
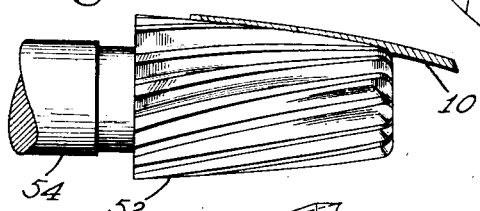
Fig. 4 shows the milling cutter in elevation and a portion of the trimming cutter in section to illustrate their relation from another point of view.

In Fig. 4 a portion of the cutter 10 is shown in section and as to this element the plane of the section coincides with the line A—A in Figs. 3 and 5. This plane intersects the cutter 10 with a circumferential component which is manifested in Fig. 4 by a slight convexity of the cutter 10. Accordingly, to compensate for such convexity, so that the milling cutter 52 will cut to a uniform depth throughout the length of its profile, a corresponding convexity is given to the profile of the milling cutter. This also is illustrated in Fig. 4 and also in Figs. 3 and 5.

When the cutter 10 has been sharpened by grinding the circular external surface 51 to intersect the flutes 48 the endless scalloped cutting edge 28 results therefrom, and all portions of said edge are equi-distant from the center of the cutter. The cutting teeth have an extremely rapid cutting action, and when they all protrude equally, as they are bound to when the cutter is truly circular, they all share equally in the cutting burden and therefore prolong the periods of effectiveness of the cutter between sharpening operations in comparison to the corresponding periods of a distorted cutter. When the cutting edge becomes dull, it may be quickly resharpened by presenting an abrading element such as a grinding wheel to the surface 51 while the cutter rotates about its axis. The aforesaid Letters Patent No. 1,226,872 illustrates a grinding wheel arranged to operate in the manner and for the purpose just described.

Having thus described my invention, what I claim as new and desire to secure by Letters Patent of the United States is:

1. An annular cutter having a cutting edge at one end and a series of flutes arranged in oblique relation to the axis and the circumference thereof to stiffen the cutter against circumferential distortion.

2. An annular cutter having an endless cutting edge at one end and a series of flutes each beginning at said edge and extending toward the opposite end of the cutter whereby scallops are formed in said edge, said flutes being arranged in oblique relation to the axis and the circumference of the cutter to stiffen the latter against circumferential distortion.

3. An annular cutter of frusto-conical form having a cutting edge at one end and a series of flutes arranged in oblique relation to the axis and the circumference of the cutter to stiffen the latter against circumferential distortion.

4. An annular cutter of frusto-conical form having an endless cutting edge at one end and a series of flutes each beginning at said end and extending toward the opposite end whereby scallops are formed in said edge, said flutes being arranged in oblique relation to the circumference of the cutter to stiffen the latter against circumferential distortion.

5. An annular cutter of frusto-conical form having an endless cutting edge at its larger end and a series of flutes beginning at said end and extending toward the smaller end whereby scallops are formed in said edge, said flutes being arranged in oblique relation to the circumference of the cutter to stiffen the latter against circumferential distortion.

6. An annular frusto-conical cutter having a circular outer surface, a series of flutes in its inner surface, and a cutting edge at its larger end, said flutes extending to said edge whereby scallops are formed in the latter, and said flutes being arranged in oblique relation to the circumference of the cutter to stiffen the latter against circumferential distortion.

7. An annular frusto-conical cutter having a circular outer surface, a series of arcuate flutes in its inner surface, and a cutting edge at its larger end, said flutes extending to said edge whereby scallops are formed in the latter, and said flutes being arranged in oblique relation to the circumference of the cutter whereby the latter is stiffened against circumferential distortion.

In testimony whereof I have signed my name to this specification.

RICHARD O. STEPHENSON.